United States Patent
Henson et al.

(10) Patent No.: US 11,628,397 B2
(45) Date of Patent: Apr. 18, 2023

(54) SPACESUIT CONTAMINANT REMOVAL USING LIQUID SORBENT

(71) Applicant: Honeywell International Inc., Morris Plains, NJ (US)

(72) Inventors: Phoebe Henson, Scottsdale, AZ (US); Rebecca Kamire, Buffalo Grove, IL (US); Stephen Yates, South Barrington, IL (US)

(73) Assignee: Honeywell International Inc., Charlotte, NC (US)

( * ) Notice: Subject to any disclaimer, the term of this patent is extended or adjusted under 35 U.S.C. 154(b) by 263 days.

(21) Appl. No.: 16/831,565

(22) Filed: Mar. 26, 2020

(65) Prior Publication Data
US 2021/0299606 A1    Sep. 30, 2021

(51) Int. Cl.
B01D 53/22    (2006.01)
B01D 53/14    (2006.01)
B64G 6/00    (2006.01)

(52) U.S. Cl.
CPC ....... B01D 53/229 (2013.01); B01D 53/1412 (2013.01); B01D 53/1425 (2013.01); B01D 53/1443 (2013.01); B01D 53/1475 (2013.01); B64G 6/00 (2013.01); B01D 2053/224 (2013.01); B01D 2252/30 (2013.01)

(58) Field of Classification Search
CPC .............. B01D 53/229; B01D 53/1412; B01D 53/1425; B01D 53/1443; B01D 53/1475; B01D 2053/224; B01D 2252/30; B01D 2259/4575; B01D 53/1418; B01D 2257/504; B01D 2257/80; B64G 6/00
See application file for complete search history.

(56) References Cited

U.S. PATENT DOCUMENTS

| 6,709,483 | B1* | 3/2004 | Hodgson, Jr. | B01D 53/04 95/98 |
| 9,044,566 | B2* | 6/2015 | Wickham | B64D 13/00 |
| 10,668,428 | B2* | 6/2020 | Weng | B01D 53/18 |
| 10,688,435 | B2* | 6/2020 | Henson | B64D 13/06 |
| 11,123,685 | B2* | 9/2021 | Isobe | F24F 3/14 |
| 11,179,670 | B2* | 11/2021 | Weng | B01D 53/18 |
| 11,202,987 | B2* | 12/2021 | Henson | B01D 53/26 |
| 2009/0220388 | A1* | 9/2009 | Monzyk | B01D 53/326 429/8 |

(Continued)

OTHER PUBLICATIONS

Papale et al., "Rapid Cycle Amine (RCA 2.0) System Development," American Institute of Aeronautics and Astronautics Meeting paper, 43rd International Conference on Environmental Systems, Jul. 2013, https://doi.org/10.2514/6.2013-3309, 13 pp.

*Primary Examiner* — Stephen Hobson
(74) *Attorney, Agent, or Firm* — Shumaker & Sieffert, P.A.

(57) ABSTRACT

A spacesuit contaminant removal system includes at least one membrane separator and a liquid sorbent circuit. The at least one membrane separator is configured to receive a spent air stream from a ventilation system of a spacesuit and absorb a contaminant from the spent air stream into a liquid sorbent. The at least one membrane separator is configured to discharge a clean air stream to the ventilation system and discharge the contaminant in a contaminant stream to a space environment using a vacuum of the space environment. The liquid sorbent circuit is configured to circulate the liquid sorbent through the at least one membrane separator.

16 Claims, 8 Drawing Sheets

(56) References Cited

U.S. PATENT DOCUMENTS

| | | | |
|---|---|---|---|
| 2010/0180889 A1* | 7/2010 | Monzyk | C25B 3/25 |
| | | | 204/264 |
| 2014/0283839 A1* | 9/2014 | Wickham | B01D 71/06 |
| | | | 128/205.27 |
| 2018/0056234 A1* | 3/2018 | Weng | B64G 1/48 |
| 2018/0243682 A1* | 8/2018 | Isobe | B01D 53/1425 |
| 2018/0243685 A1* | 8/2018 | Henson | B64G 1/48 |
| 2021/0061475 A1* | 3/2021 | Kamire | B01D 53/1412 |
| 2021/0069635 A1* | 3/2021 | Skomurski | B01D 53/1443 |

* cited by examiner

SPACESUIT CONTAMINANT REMOVAL USING LIQUID SORBENT

TECHNICAL FIELD

The present disclosure relates to systems and techniques for removing contaminants from a spacesuit using contaminant removal systems.

BACKGROUND

A primary life support system (PLSS) of a spacesuit may provide basic life support functions for an astronaut including spacesuit pressure regulation; oxygen supply, cooling, and recirculation; contaminant removal; cooling water recirculation; and communications and telemetry. An amount of extravehicular activity (EVA) of the astronaut may be limited by an ability of the contaminant removal system to remove carbon dioxide emitted by the astronaut from a recirculated air stream. To remove carbon dioxide from the recirculated air stream, a contaminant control cartridge containing lithium hydroxide may react with the carbon dioxide to form lithium carbonate and water. However, these contaminant control cartridges are non-regenerable, such that extravehicular activity may be limited to ten hours or less. Alternatives to the contaminant control cartridge may use regenerable sorbents for absorbing and desorbing contaminants. However, these alternatives may not sufficiently separate the astronaut from a space vacuum, such that catastrophic failure of a component separating the astronaut from the space vacuum may be fatal.

As one example, a rapid cycle amine (RCA) system may include a swing-bed, vacuum regenerated process that uses a solid amine sorbent. A first bed may absorb carbon dioxide and humidity from an air stream, while a second bed may desorb the carbon dioxide and humidity into space vacuum. The two beds may alternate these absorption and desorption functions through a system of valves. However, this system of valves may pose a safety risk to the astronaut, as failure of a valve may expose the astronaut to space vacuum.

As another example, a membrane system may include a membrane with an ionic liquid impregnated in pores of the membrane. The ionic liquid may absorb carbon dioxide and humidity from the air stream on a first side of the membrane and desorb the carbon dioxide and humidity into space vacuum on a second, opposite side of the membrane. However, this relatively thin membrane may be the sole containment between the astronaut and space vacuum, such that failure of the membrane may expose the astronaut to space vacuum. Further, such membrane may not adequately contain the ionic liquid, limiting a lifetime of the membrane.

SUMMARY

The disclosure describes systems and techniques for removing contaminants from a spacesuit using a liquid sorbent and discharging the contaminants from the spacesuit. Rather than separate the astronaut from space vacuum using a single membrane or sorbent bed, a contaminant removal system may maintain at least two degrees of containment between the astronaut and space vacuum. The contaminant removal system may treat the contaminant-containing air using one or more membrane separators to absorb contaminants from the air into a liquid sorbent using a first membrane separator and desorb the contaminants from the liquid sorbent into a contaminant stream using a second membrane separator. Failure of a membrane, valve, or other separation component may not expose the astronaut to space vacuum. Some desorbed contaminants, such as carbon dioxide, may be discharged from the spacesuit into space vacuum while other components, such as water, may be removed from various fluid streams of the spacesuit to provide a sweep gas to the second membrane separator or regulate a temperature of the astronaut. As such, contaminant removal systems discussed herein may be safe, durable, and regenerable.

In some examples, the disclosure describes a spacesuit contaminant removal system that includes at least one membrane separator and a liquid sorbent circuit. The at least one membrane separator is configured to receive a spent air stream from a ventilation system of a spacesuit and absorb a contaminant from the spent air stream into a liquid sorbent. The at least one membrane separator is configured to discharge a clean air stream to the ventilation system and discharge the contaminant in a contaminant stream to a space environment using a vacuum of the space environment. The liquid sorbent circuit is configured to circulate the liquid sorbent through the at least one membrane separator.

In some examples, the disclosure describes the spacesuit contaminant removal system described above, in which the at least one membrane separator includes a scrubber-separator and a stripper-separator downstream of the scrubber-separator. The scrubber-separator is configured to absorb the contaminant from the spent air stream into the liquid sorbent and discharge the clean air stream to the ventilation system. The stripper-separator is configured to desorb the contaminant from the liquid sorbent using the vacuum and discharge the contaminant stream to the space environment.

In some examples, the disclosure describes a method for removing a contaminant from a spacesuit that includes, by at least one membrane separator, receiving a spent air stream from a ventilation system of the spacesuit and absorbing the contaminant from the spent air stream into a liquid sorbent. The method includes, by a liquid sorbent circuit, circulating the liquid sorbent through the at least one membrane separator. The method includes, by the at least one membrane separator, discharging a clean air stream to the ventilation system and discharging the contaminant in a contaminant stream to a space environment using a vacuum of the space environment.

In some examples, the disclosure describes a method for removing a contaminant from a ventilation system of a spacesuit that includes, by a controller, controlling a liquid sorbent circuit to circulate a liquid sorbent through a membrane scrubber-separator and a membrane stripper-separator. The liquid sorbent includes a contaminant absorbed from a spacesuit ventilation system. The method further includes, by the controller, controlling a back pressure regulator valve fluidically coupled to the membrane stripper-separator and a space environment to create a pressure differential across the membrane stripper-separator to desorb the contaminant from the liquid sorbent.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1:
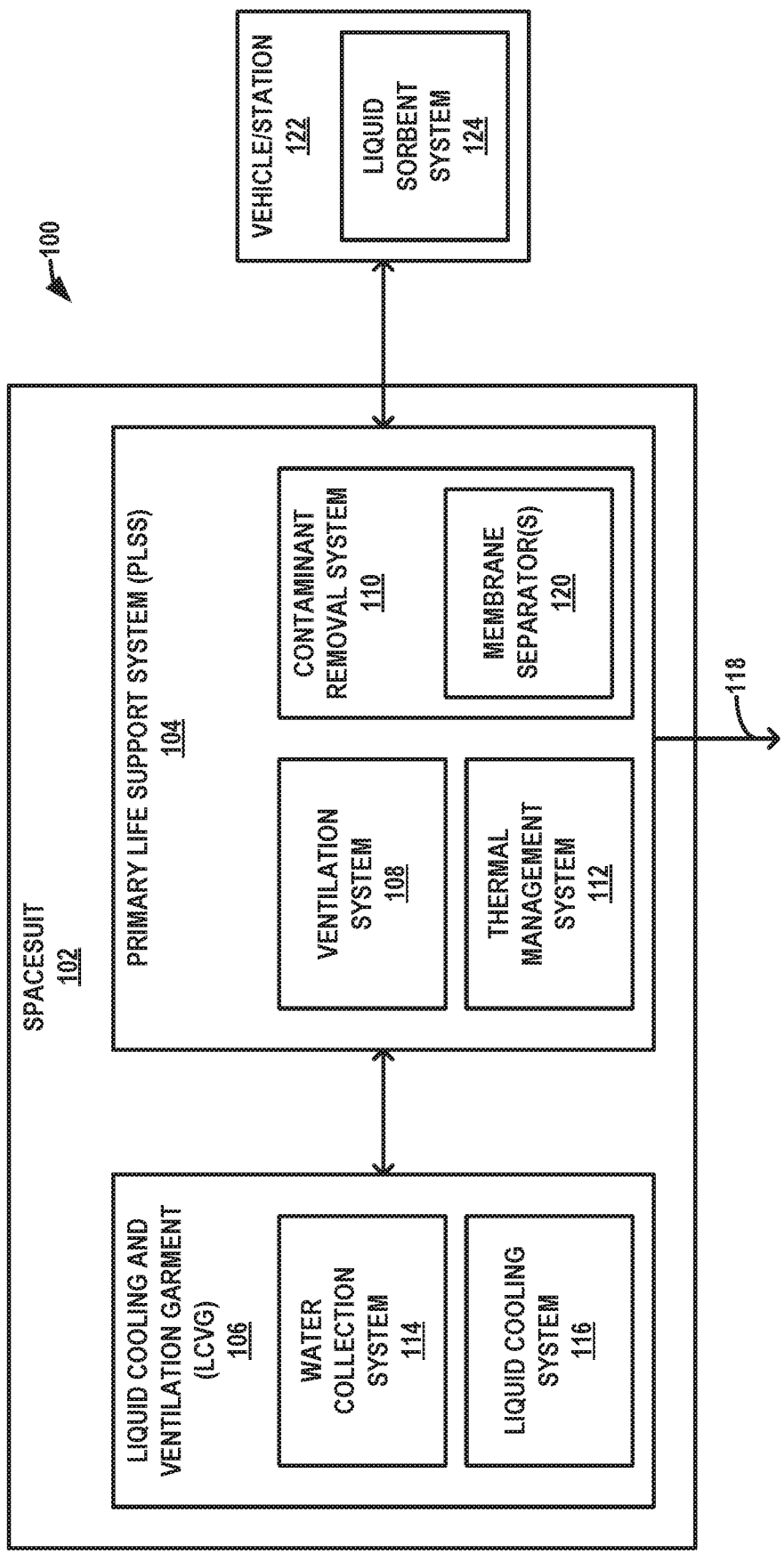
FIG. 1 is a schematic block diagram illustrating an example extra-vehicular activity (EVA) system that includes a contaminant removal system for removing contaminants from a ventilation system of a spacesuit using a liquid sorbent and discharging the contaminants from the spacesuit.

FIG. 1 is a schematic block diagram illustrating an example extra-vehicular activity (EVA) system 100. EVA system 100 includes a spacesuit 102, such as may be worn by an individual, such as an astronaut, for EVA tasks external to a space vehicle/station 122. Spacesuit 102 may be configured to protect the individual in a vacuum environment, such as a space vacuum environment (e.g., less than about $2.5 \times 10^{-4}$ torr). Spacesuit 102 includes a primary life support system (PLSS) 104 and a liquid cooling and ventilation garment (LCVG) 106. LCVG 106 may be worn over skin of the astronaut, while PLSS 104 may be worn over LCVG 106 and on a back and/or shoulders of the astronaut.

LCVG 106 may be configured to remove heat and/or waste fluid from the astronaut. LCVG 106 is illustrated as including a water collection system 114 and a liquid cooling system 116; however, LCVG may include other systems that perform heat and/or waste fluid removal functions. Water collection system 114 may be configured to remove sweat from the astronaut and store the sweat or supply the sweat to other systems. Liquid cooling system 116 may be configured to receive cooling fluid from PLSS 104, such as from a thermal management system 112, remove heat from the astronaut using the cooling fluid, and discharge the warmed cooling fluid back to PLSS 104.

PLSS 104 may be configured to provide life support to the astronaut. PLSS 104 may provide functions that include, but are not limited to: regulating pressure of spacesuit 102; supplying, cooling, and recirculating oxygen to the astronaut; cooling and recirculating air and water to LCVG 106; removing contaminants from recirculated oxygen and discharging the contaminants as a contaminant stream 118; and providing telecommunications and telemetry from spacesuit 102. Spacesuit 102 is illustrated as including ventilation system 108, contaminant removal system 110, and thermal management system 112; however, PLSS 104 may include other systems that perform life support functions. Ventilation system 108 may be configured to supply oxygen to the astronaut and recirculate air from the astronaut to contaminant removal system 110. For example, ventilation system 108 may discharge spent air to contaminant removal system 110 and receive clean air from contaminant removal system 110. Thermal management system 112 may be configured to cool and recirculate oxygen, water, and/or cooling fluid to and from LCVG 106 to maintain a temperature of the astronaut within a desired range. For example, thermal management system 112 may include one or more pumps, heat exchangers, and/or other equipment for cooling and/or circulating oxygen, water, and/or cooling fluid. In some examples, such as may be described further in FIG. 3, PLSS 104 may exchange sorbent with a liquid sorbent system 124 of vehicle/station 122.

Contaminant removal system 110 may be configured to remove contaminants from air in spacesuit 102 using a liquid sorbent. Contaminant removal system 110 includes at least one membrane separator 120 ("membrane separator(s) 120") and a liquid sorbent circuit (not shown in FIG. 1). Membrane separator(s) 120 is configured to receive a spent air stream from ventilation system 108, absorb a contaminant from the spent air stream into a liquid sorbent, and discharge a clean air stream to ventilation system 108. The liquid sorbent circuit may be configured to circulate the liquid sorbent through membrane separator(s) 120. Contaminant removal system 110 may be configured to either/both discharge the contaminant as contaminant stream 118 to the space vacuum environment using a vacuum of the space vacuum environment or store the contaminants in spacesuit 102 and discharge the liquid sorbent to liquid sorbent system 124.

Membrane separator(s) 120 discussed herein may include one or more membrane contactors configured to flow or expose contaminated air on a first side and flow liquid sorbent on a second, opposite side. The high surface area of the hollow fiber membrane contactors enables a high mass transfer of contaminants from ventilation system 108, such as carbon dioxide and water, into the liquid sorbent using a relatively small system volume and weight. The material of the hollow fibers may be selected such that the liquid sorbent does not wet the pores, and the trans-membrane pressure is kept sufficiently low to prevent pore penetration. As a result, the membrane contactor may ensure that the liquid sorbent and gas stream do not need further separation, such that contaminant removal system 110 may act in a relatively gravity-independent way. In some examples, the liquid sorbent may be a liquid ionic sorbent. Such liquid ionic sorbents may be salts that are generally comprised of an anion and organic cation. These salts may be liquid at their temperature of use, have effectively zero vapor pressure, be generally nontoxic, and/or have sufficient stability to resist deterioration. Liquid sorbents may be water soluble, hygroscopic (i.e., capable of absorbing moisture from the air), and/or capable of releasing water by evaporation, such as by elevating the temperature or reducing the water partial pressure. In some instances, a regeneration temperature of ionic sorbent may be lower than other sorbents, such as amine sorbents.

By using a continuous, regenerable liquid sorbent system may remove contaminants from ventilation system 108, spacesuit 102, with or without station/vehicle 122, and may have increased EVA, reduced severity of component failure, reduced complexity, and/or reduced size compared to spacesuits that do not use a regenerable liquid sorbent system. For example, because the liquid sorbent is continually moved between membrane separator(s) 120, an inventory of liquid sorbent in the liquid sorbent circuit may be relatively small. In contrast, with solid adsorbents, a bed must last some discrete period of time before it is cycled to regeneration. The length of time required for regeneration generally sets this period of time, but the adsorbent bed has to be large enough to handle the astronaut's needs while the alternative bed is being regenerated. As such, continuous liquid sorbent systems discussed herein may have smaller size and lower weight, especially for relatively long EVA sessions.

In operation, as the astronaut operates outside vehicle/station 122, contaminant removal system 110 may continuously remove contaminants from ventilation system 108. One or more of membrane separator(s) 120 may receive a spent air stream from ventilation system 108 that includes a relatively high concentration of contaminants, such as carbon dioxide or water. The liquid sorbent circuit may circulate the liquid sorbent through membrane separator(s) 120, such that the contaminant removal system may operate without the use of frequently alternating valves (e.g., as in a swing bed operation), thereby reducing a number or severity of failure points in the system. Membrane separator(s) 120 may absorb the contaminant from the spent air stream into the liquid sorbent and discharge a clean air stream to ventilation system 108. In some examples, another of membrane separator(s) 120 may discharge the contaminant in contaminant stream 118 to a space environment using a vacuum of the space environment. In some examples, the liquid sorbent circuit may discharge spent liquid sorbent to liquid sorbent system 124, such as if an astronaut is near vehicle/station 122 or spacesuit 102 includes only membrane scrubber-separator(s).

Discharge of contaminants into the space vacuum environment may be particularly useful, as the low pressure of the space vacuum environment may create a high pressure differential across membranes of membrane separator(s) 120 to remove absorbed contaminants from the sorbent. However, this low pressure may also pose a safety risk to the astronaut, as failure of one or more components separating ventilation system 108 from the space vacuum environment may expose the astronaut to the low pressure of the space vacuum environment.

Figure 2:
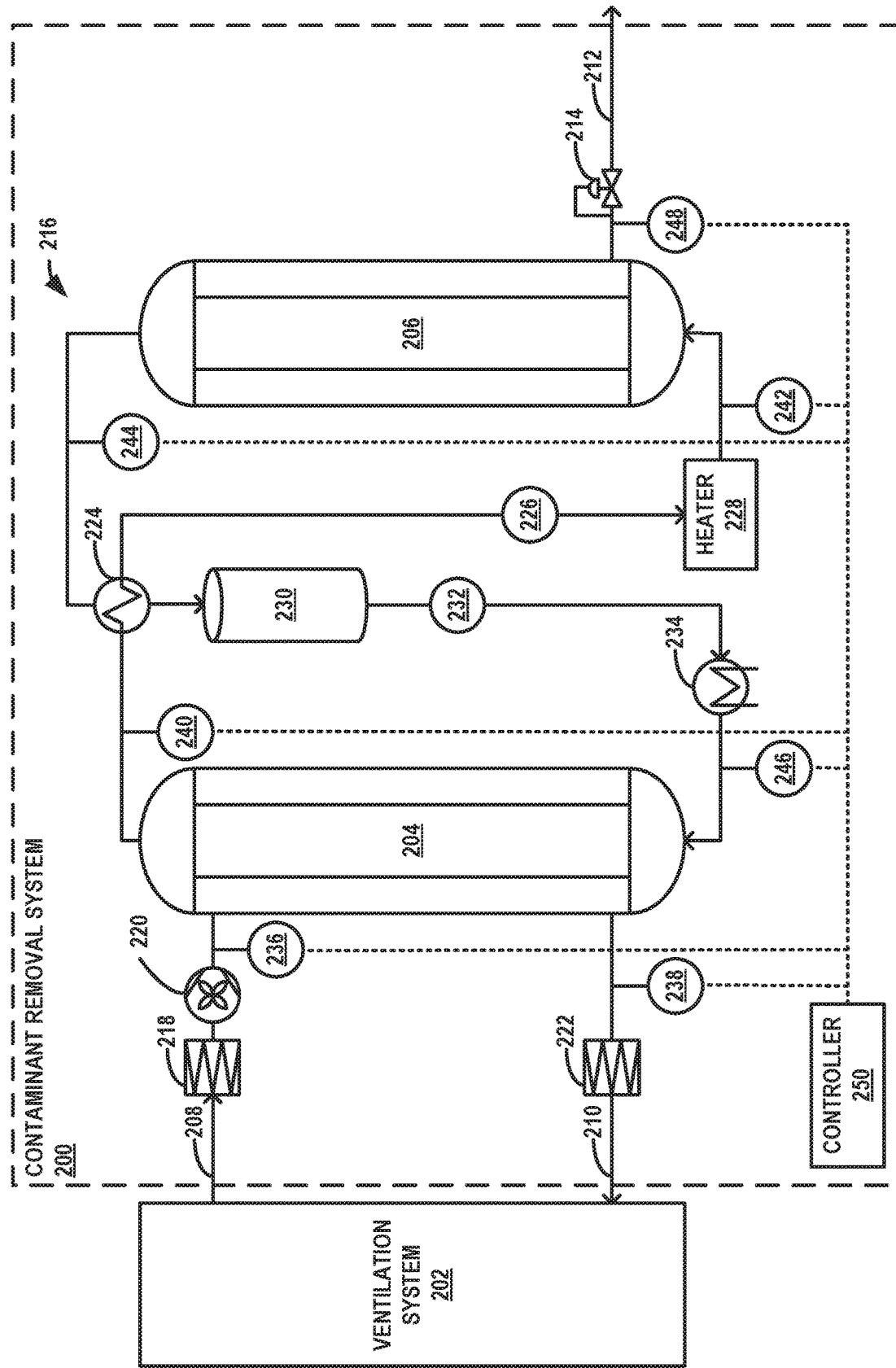
FIG. 2 is a diagram illustrating an example contaminant removal system for removing contaminants from a spacesuit ventilation system using a liquid sorbent with a membrane scrubber-separator and a membrane stripper-separator.

In some embodiments of contaminant removal systems discussed herein, contaminants may be removed from a spacesuit and discharged from the spacesuit into a space vacuum environment using at least one membrane scrubber-separator and at least one membrane stripper-separator. For example, two membrane separators connected in series may form a liquid sorbent circuit that is capable of continuous scrubbing of contaminants from the spent air in a first membrane separator to produce clean air and stripping of the contaminants from the used liquid sorbent in a second membrane separator to discharge the contaminants to the space vacuum environment. Such contaminant removal systems may separate the air supplied to the astronaut from the space vacuum environment by a liquid system that carries contaminants between the air and the space vacuum environment, such that there is no direct fluidic connection between the air supplied to the astronaut and the space vacuum environment. FIG. 2 is a diagram illustrating an example contaminant removal system 200 for removing contaminants from a spacesuit ventilation system 202 using a liquid sorbent with a membrane scrubber-separator 204 and a membrane stripper-separator 206.

Contaminant removal system 200 includes connections to systems outside contaminant removal system 200, including ventilation system 202, a cooling system (not shown) for various heat transfer components, and a space vacuum environment outside the spacesuit. Contaminant removal system 200 includes an inlet configured to receive spent air stream 208 from ventilation system 202 and an outlet configured to discharge clean air stream 210 to ventilation system 202. Clean air stream 210 has a contaminant concentration that is lower than spent air stream 208. Clean air stream 210 may still include contaminants, though the contaminants would be below a threshold level for each contaminant. Contaminant removal system 200 includes an overboard outlet configured to discharge a contaminant stream 212 from the spacesuit.

Contaminant removal system 200 includes a ventilation air circuit configured to circulate air between ventilation system 202 and scrubber-separator 204. In the example of FIG. 2, spent air stream 208 includes a filter 218 configured to remove particulates from spent air stream 208 prior to entry into scrubber-separator 204 and a blower 220 configured to draw ventilation air into scrubber-separator 204. In the example of FIG. 2, clean air stream 210 includes a filter 222 configured to remove any leaked liquid sorbent and/or further filter clean air from clean air stream 210 prior to entry into ventilation system 202. Clean air stream 210 may have a concentration of a contaminant that is about 25% to about 99% less than a concentration of the contaminant in spent air stream 208. In some examples, spent air stream 208 may have a carbon dioxide partial pressure between about 1 torr and about 15 torr.

Contaminant removal system 200 includes a liquid sorbent circuit 216 configured to circulate liquid sorbent between scrubber-separator 204 and stripper-separator 206. For example, a pump 232 may pump clean liquid sorbent from a clean liquid sorbent storage 230 into scrubber-separator 204, while pump 226 may pump used liquid sorbent from scrubber-separator 204 to stripper-separator 206. Clean liquid sorbent may include unused liquid sorbent free of contaminants or regenerated liquid sorbent having a lower concentration of contaminants than the used liquid sorbent. In some examples, pump 226 and/or pump 232 may include a pump that limits or prevents backflow of liquid sorbent, such as a piston pump. Such a pump may help protect the astronaut from leaks of liquid sorbent that may occur at an unmanageable rate.

In some examples, the clean liquid sorbent may be cooled by a cooler 234 prior to entry into scrubber-separator 204. Cooler 234 may be fluidically coupled to a coolant loop, such as may be provided by a thermal management system (e.g., thermal management system 112). In some examples, the used liquid sorbent may be preheated by a heat exchanger 224 and/or heater 228 prior to entry into stripper-separator 206. In some examples, heat exchanger 224 and/or heater 228 may heat the liquid sorbent to a relatively high temperature compared to contaminant removal systems that do not include additional containment (e.g., scrubber-separator 204) or cooling (e.g., cooler 234) between stripper-separator 206 and ventilation system 202. In examples in which an ionic liquid sorbent is used, heat exchanger 224 and/or heater 228 may preheat the liquid sorbent to a relatively low temperature compared to other liquid sorbents, as the ionic liquid sorbents may have relatively low regeneration temperatures.

Contaminant removal system 200 includes scrubber-separator 204 between the ventilation air circuit and liquid sorbent circuit 216. On a gas phase side, scrubber-separator 204 is configured to receive spent air from spent air stream 208. Spent air from spent air stream 208 includes contaminants from ventilation system 202, such as carbon dioxide, water, and other gaseous substances. Scrubber-separator 204 is configured to absorb one or more contaminant species in the spent air from spent air stream 208 into a liquid sorbent. Scrubber-separator 204 includes one or more separation membranes, each configured to flow (e.g., provide or direct flow of) spent air from spent air stream 208 on a gas phase side of the respective membrane and flow a liquid sorbent on a liquid phase side of the membrane. Contaminants, such as carbon dioxide and/or water, may flow through the membrane due to a concentration gradient and become absorbed by the liquid sorbent, while the liquid sorbent may not substantially flow through the membrane. As a result, clean air discharged from scrubber-separator 204 may have a lower concentration of contaminants than spent air received by scrubber-separator 204. Scrubber-separator 204 is configured to discharge a clean air stream 210 to ventilation system 202. On a liquid phase side, scrubber-separator 204 is configured to receive clean liquid sorbent. The clean liquid sorbent may flow through scrubber-separator 204 and absorb contaminants from spent air of spent air stream 208 through the membrane(s) of scrubber-separator 204. As a result, the used liquid sorbent discharged from scrubber-separator 204 may have a higher concentration of contaminants than the clean liquid sorbent received by scrubber-separator 204. Scrubber-separator 204 may discharge the used liquid sorbent containing the contaminants to stripper-separator 206.

Contaminant removal system 200 includes stripper-separator 206 between liquid sorbent circuit 216 and the space vacuum environment. On a liquid phase side, stripper-separator 206 is configured to receive used liquid sorbent from scrubber-separator 204 and desorb one or more contaminants from the used liquid sorbent. Stripper-separator 206 includes one or more membranes, each configured to flow the used liquid sorbent on one side of the membrane and contaminated air to a contaminant stream 212 on an opposite side of the membrane. Contaminants may flow through the membrane due to a concentration gradient, while the liquid sorbent may not substantially flow through the membrane. As a result, clean liquid sorbent discharged from stripper-separator 206 may have a lower concentration of contaminants than the used liquid sorbent received by stripper-separator 206. On a gas phase side, stripper-separator 206 is configured to discharge the contaminant in a contaminant stream 212. Contaminant stream 212 may be continuously removed from stripper-separator 206 to assist migration of the contaminants from the used liquid sorbent into contaminant stream 212.

By including both scrubber-separator 204 and stripper-separator 206 between ventilation system 202 and the space vacuum environment, the astronaut may be better protected from the space vacuum environment than contaminant removal systems that continuously operate with only a single membrane separator between the astronaut and the space vacuum environment, such as a reaction system using a single membrane or a rapid cycle amine system using a valve system. For example, if the astronaut may be separated from the space vacuum environment by scrubber-separator 204 and/or various components of liquid sorbent circuit 216 (e.g., pumps 226 and 232).

In some examples, stripper-separator 206 may include various features configured for a space vacuum environment. Stripper-separator 206 may include one or more open protective structures between membranes of stripper-separator 206 and the space environment, such as baffles or louvers configured to protect the membranes from sunlight or radiation. In some instances, stripper-separator 206 may include a port or other opening configured to discharge contaminant stream 212 to the space vacuum environment. In some examples, stripper-separator 206 may include a back pressure regulator valve 214 fluidically coupled to a port. Back pressure regulator valve 214 may be configured to control a vacuum for a gas phase side of stripper-separator 206. For example, a vacuum may increase a rate of desorption of the contaminants from the used liquid sorbent without a sweep gas stream or with a smaller sweep gas stream, as will be explained further in FIGS. 3A-4. Back pressure regulator valve 214 may be configured to reduce or eliminate build-up of ice on stripper-separator 206.

In some examples, stripper-separator 206 may be configured to utilize conditions of the space vacuum environment to increase desorption of contaminants from the used liquid sorbent in stripper-separator 206. For example, desorption of contaminants from the used liquid sorbent may be increased by decreasing a partial pressure of contaminant gases on the gas phase side to create a driving force for the contaminants to desorb from the used liquid sorbent and migrate into contaminant stream 212. Contaminant removal system 200 may decrease the partial pressure by exposing stripper-separator 206 to very low pressure of the space vacuum environment. For example, the space vacuum environment on the gas phase side of the membranes of stripper-separator 206 may create partial pressures that are similar to those of high flow sweep gas streams. In this way, conditions relatively specific to a space vacuum environment may assist in contaminant removal from stripper-separator 206.

Membrane separators discussed herein may include one or more membrane contactors configured to flow a gas (e.g., ventilation system or vacuum atmosphere) on a first side and liquid sorbent on a second, opposite side. For example, a membrane separator may include a plurality of parallel membrane contactors. In some examples, a membrane contactor may include a cylindrical module filled with parallel or woven hollow porous fibers. For example, dimensions of these hollow fibers could be less than about 3 mm, and the pore dimension could be less than about 2 microns. The high surface area of the hollow fiber membrane contactors enables a high mass transfer of contaminants from ventilation system 108, such as carbon dioxide and water, into the liquid sorbent using a relatively small system volume and weight. In some examples, baffles or other structures, such as threads or other fibers, may also be present between the fibers, between the fibers and the outer shell, or perpendicular to fibers to improve mixing of the fluid on the shell side. In some examples, flow on the shell side may be swirled or turbulated using duct bends prior to entry into the membrane module and/or angling flow entry vector into the module and/or using guide vanes or similar structures to enhance mass transfer through the membrane. Ports on ends of the modules may connect to a manifold (e.g., a "tube sheet") allowing fluid flow from the ports through the bore of each fiber and hence to the opposing port. Additional ports may access the shell-side at opposite ends of the module, allowing fluid flow on the outside of the fibers through the module. The material of the hollow fibers can be selected such that the liquid sorbent does not wet the pores, and the trans-membrane pressure is kept sufficiently low to prevent pore penetration. As a result, the membrane contactor may ensure that the liquid sorbent and gas stream do not need further separation, such that contaminant removal system 200 may act in a relatively gravity-independent way without the use of moving parts. Fiber materials may include, but are not limited to, hydrophobic materials such as polypropylene, polyvinylidene fluoride, polysulfone, polyimide, polytetrafluoroethylene (PTFE), and the like. In some examples, a coating may be applied to reduce liquid flow through the pores. Coatings that may be used include, but are not limited to, PTFE, a crosslinked siloxane, and the like to prevent liquid flow through the pores. Liquid sorbent flow may be either on a "tube" side (e.g., flowing through a central bore of fibers) or a "shell" side (e.g., flowing around an outside of fibers and within a surrounding shell) of the membrane separator, while a gas may be flowed on the opposite "shell" side or "tube" side, respectively. In some examples, liquid sorbents may contain relatively large organic cations and any of a variety of anions, which may be tailored to obtain desired characteristics. Liquid sorbents may be water soluble, hygroscopic (i.e., capable of absorbing moisture from the air), and/or capable of releasing water by evaporation, such as by elevating the temperature or reducing the water partial pressure.

Contaminant removal system 200 may include a process control system that includes a controller 250 and one or more sensor sets 236, 238, 240, 242, 244, 246, 248. Controller 250 may be communicatively coupled to and configured to receive measurement signals from one or more sensor sets 236, 238, 240, 242, 244, 246, 248, and other process control components (not shown) of contaminant removal system 200, such as: control valves for spent air stream 208, clean air stream 210, contaminant stream 212 (e.g., back pressure regulator valve 214), and inlets/outlets to heat exchanger 224, heater 228, liquid sorbent storage 230, and cooler 234; pumps 226 and 232; blower 220; and the like. Controller 250 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the operations described in this disclosure.

Sensor sets 236, 238, 240, 242, 244, 246, 248 may include instrumentation configured to detect any of a pressure (e.g., pressure gauges), temperature, flow rate, and/or contaminant concentration (e.g., carbon dioxide concentration or water concentration) of a liquid or gas stream of contaminant removal system 200. For a ventilation air circuit, spent air sensor set 236 may detect conditions of spent air stream 208 and clean air sensor set 238 may detect conditions of clean air stream 210. For liquid sorbent circuit 216, scrubber-separator outlet sensor set 240 may detect conditions of used liquid sorbent at an outlet of scrubber-separator 204, stripper-separator inlet sensor set 242 may detect conditions of used liquid sorbent at an inlet of stripper-separator 206, stripper-separator outlet sensor set 244 may detect conditions of clean liquid sorbent at an outlet of stripper-separator 206, and scrubber-separator inlet sensor set 246 may detect conditions of clean liquid sorbent at an inlet of scrubber-separator 204.

In some examples, controller 250 is configured to control a contaminant concentration within the environment of ventilation system 202. For example, controller 250 may be configured to receive a contaminant concentration measurement for a contaminant, such as from clean air sensor set 238 or a concentration sensor in ventilation system 202. Controller 250 may be configured to determine whether the contaminant concentration measurement exceeds a contaminant concentration setpoint. For example, the contaminant concentration setpoint may be a target concentration of clean air stream 210 for maintaining ventilation system 202 below a threshold contaminant concentration. Controller 250 may be configured to send, in response to the contaminant concentration measurement exceeding the contaminant concentration setpoint, a control signal to decrease a concentration of the contaminant in clean air stream 210. For example, controller 250 may send a control signal to increase a flow rate of liquid sorbent, a temperature of the liquid sorbent, and/or any other variable that may increase a rate of removal of contaminants from spent air stream 208.

In some examples, controller 250 may be configured to control a pressure of stripper-separator 206. For example, to control a vacuum of stripper-separator 206, the controller may receive a pressure measurement from stripper-separator 206 and, in response to the pressure measurement measuring outside a target pressure range, control back pressure regulator valve 214 to increase or decrease a pressure of stripper-separator 206.

In some embodiments of contaminant removal systems discussed herein, humidity may be removed at various points in the contaminant removal system or other spacesuit system and recycled back into one or more components of the contaminant removal system. FIGS. 3A-3C and FIG. 4 illustrate various configurations of contaminant removal systems that include components for managing humidity and/or water concentration in the various contaminant removal components. Contaminant removal systems may be configured to assist in maintaining a humidity of a clean air stream, a water concentration of the liquid sorbent, and/or a presence or humidity of a sweep gas stream using one or more water sources of the spacesuit. For example, spent air within a ventilation system may have a target humidity range for passenger comfort, such as between about 5% and about 35% relative humidity. To achieve this target humidity range, the flow rate of spent air leaving the cabin and/or the flow rate and/or humidity of clean air entering the ventilation system may be selected to maintain the humidity of the ventilation system within the target humidity range. As such, contaminant removal systems discussed herein may add water to a recycled air stream from one or more water sources on the spacesuit and/or remove water from the recycled air stream to one or more water sources on the spacesuit to achieve a desired humidity of a clean air stream entering the ventilation system. Additionally or alternatively, contaminant removal systems discussed herein may add water to a scrubber-separator as a sweep gas stream or to a liquid sorbent circuit from one or more water sources on the spacesuit to achieve a desired water concentration of the liquid sorbent. In these various ways, contaminant removal systems discussed herein may preserve finite resources during EVA in a space environment.

Figure 3A:
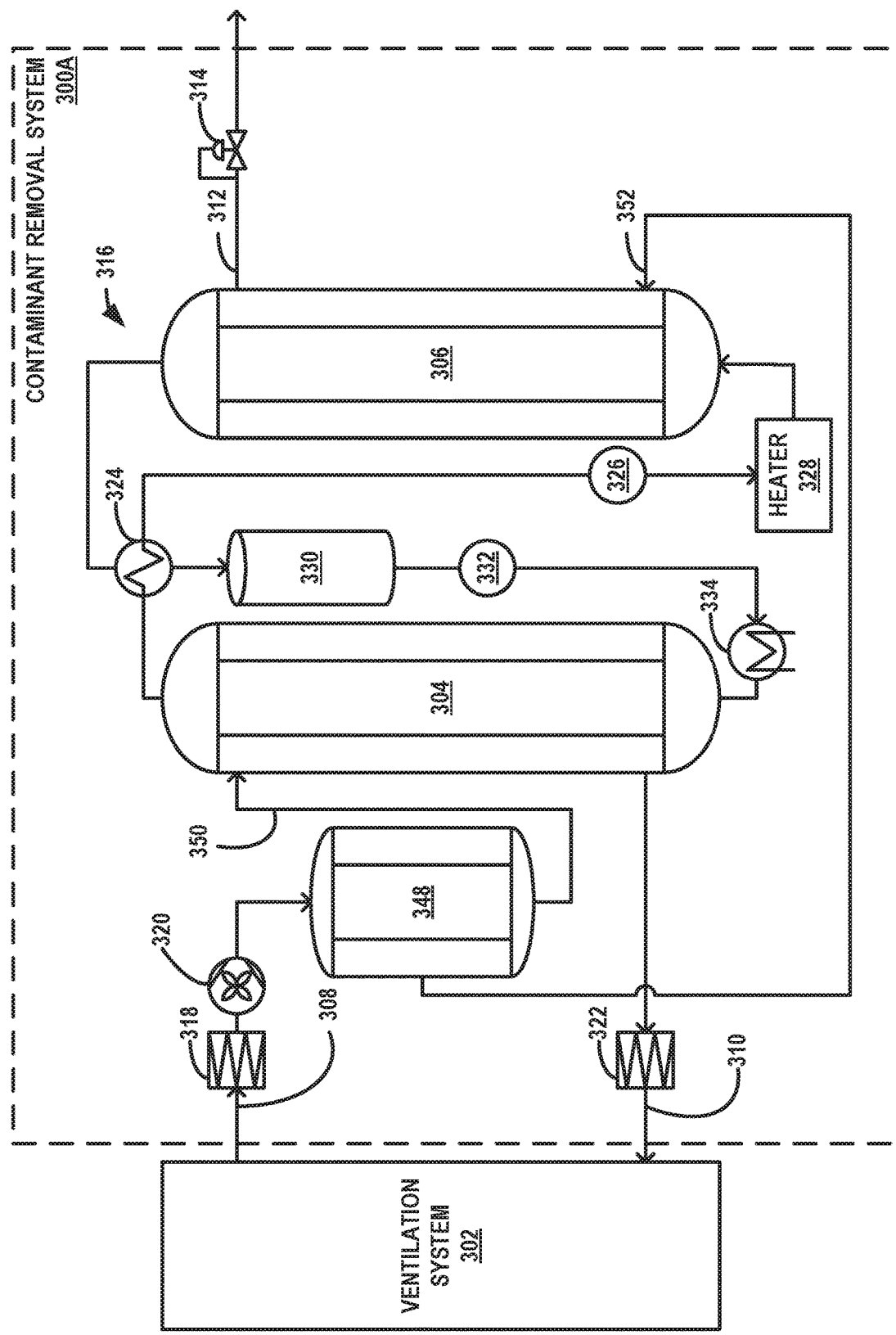
FIG. 3A is a diagram illustrating an example contaminant removal system for removing contaminants from a spacesuit ventilation system using a liquid sorbent with a membrane scrubber-separator and a membrane stripper-separator and removing humidity from a spent air stream using a membrane dehumidifier for use as a sweep gas stream.
Figure 3B:
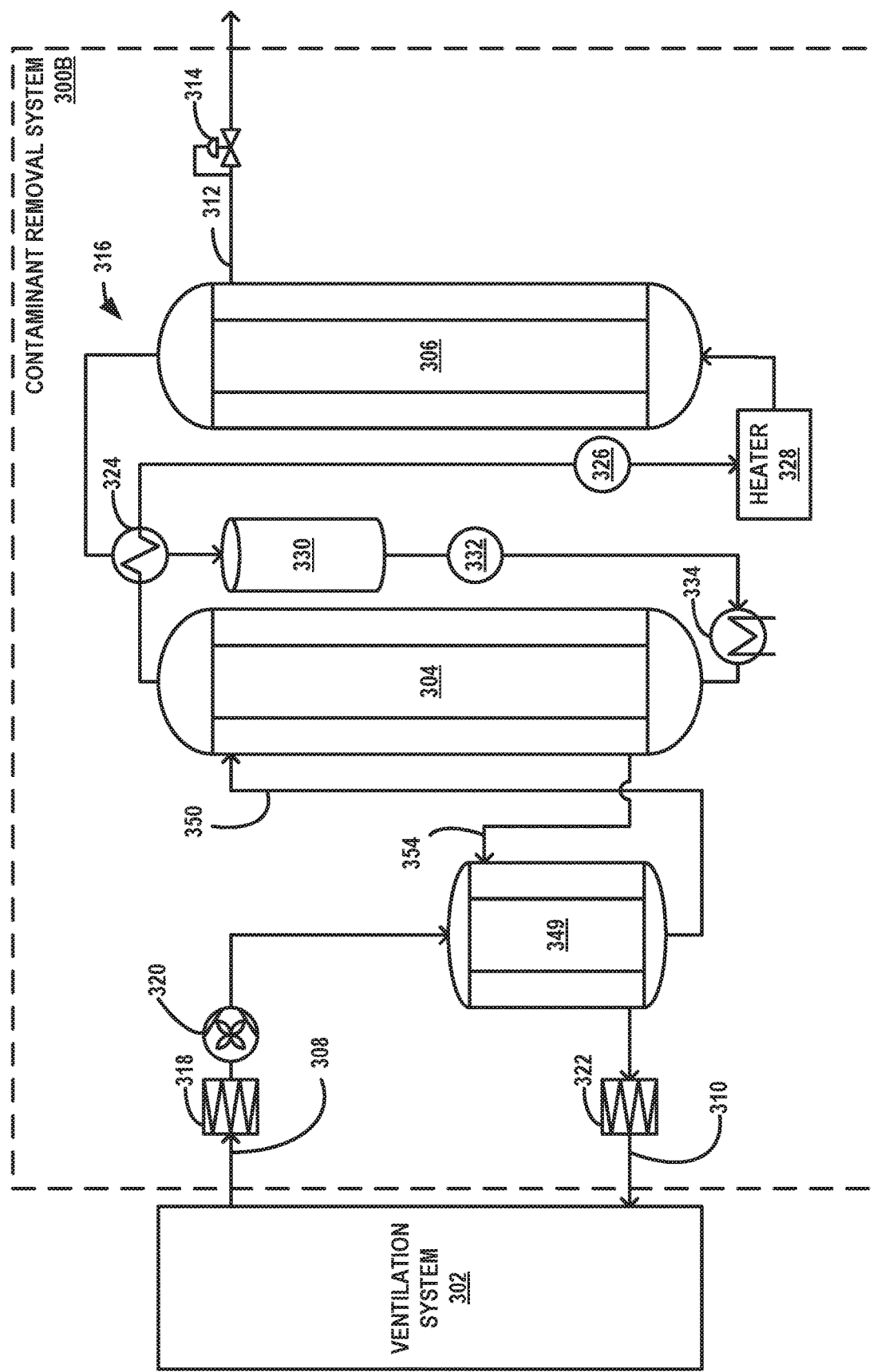
FIG. 3B is a diagram illustrating an example contaminant removal system for removing contaminants from a spacesuit ventilation system using a liquid sorbent with a membrane scrubber-separator and a membrane stripper-separator and returning humidity from a spent air stream to a clean air stream using a membrane dehumidifier.
Figure 3C:
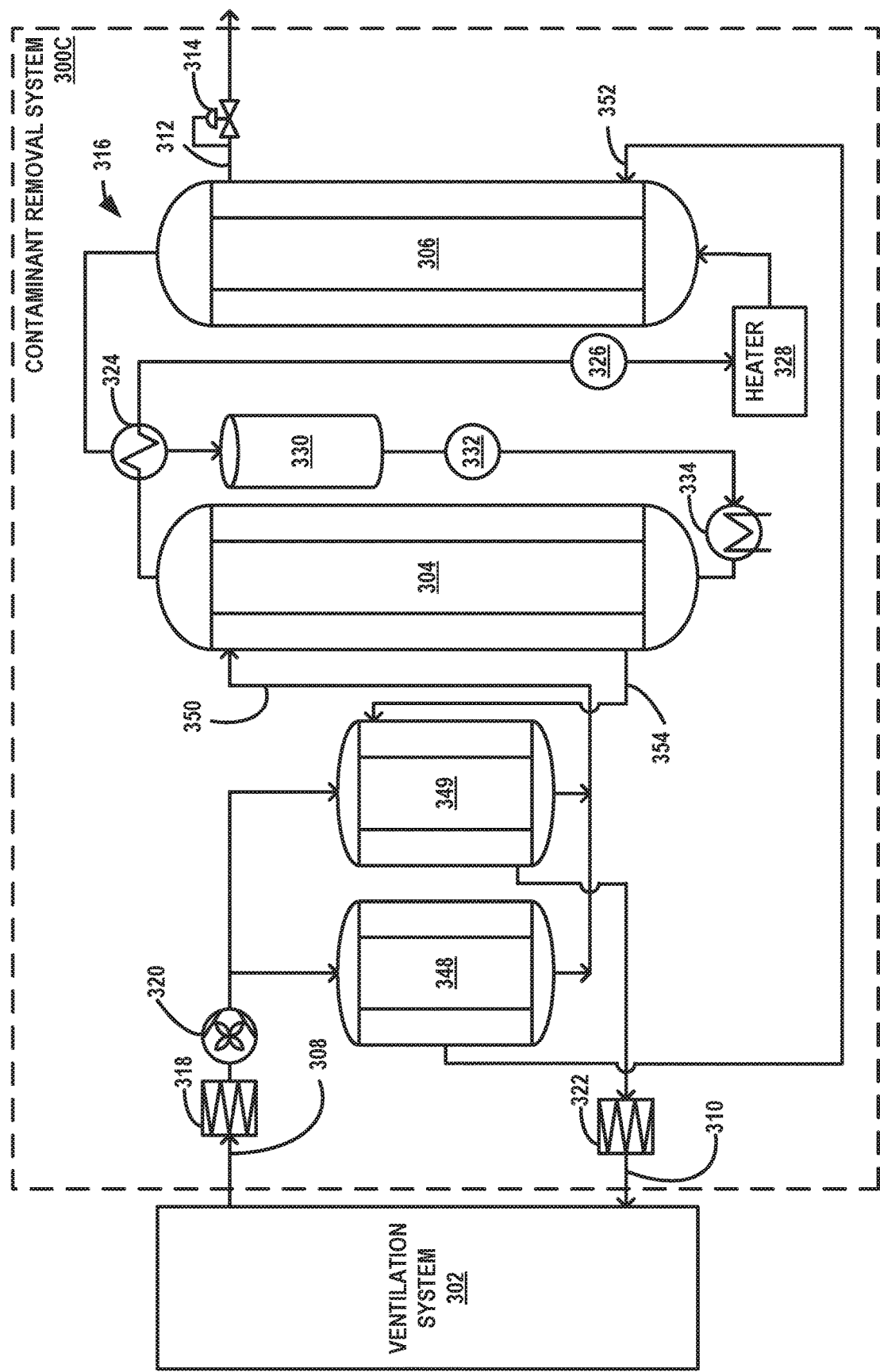
FIG. 3C is a diagram illustrating an example contaminant removal system for removing contaminants from a spacesuit ventilation system using a liquid sorbent with a membrane scrubber-separator and a membrane stripper-separator and removing humidity from a spent air stream using two parallel membrane dehumidifiers for use as a sweep gas stream or to a clean air stream.

FIGS. 3A-3C illustrate various configurations for removing humidity from one or more spacesuit air streams for use as a sweep gas in a stripper-separator or a humidifying stream for clean air. For example, as discussed above, a space vacuum environment may provide a very low partial pressure on a gas phase side of a stripper-separator. However, water may be removed from the lack of humidity in the space vacuum environment. To reduce the amount of water that may leave the liquid sorbent through the membranes, contaminant removal systems discussed herein may use humidity removed from the spent air stream and/or contaminant stream as a sweep gas on the gas phase side of the membranes, thereby increasing a partial pressure of water on the gas phase side of the membranes. Unless otherwise indicated, components of contaminant removal systems 300A and 300B may be operably similar to similarly named and/or numbered components of contaminant removal system 200 of FIG. 2. For example, a ventilation system 302, a scrubber-separator 304, a stripper-separator 306, a spent air stream 308, a clean air stream 310, a contaminant stream 312, a back pressure regulator valve 314, a liquid sorbent circuit 316, a filter 318, a blower 320, a filter 322, a heat exchanger 324, a pump 326, a heater 328, a liquid sorbent storage 330, a pump 332, and a cooler 334 may be functionally similar to ventilation system 202, scrubber-separator 204, stripper-separator 206, spent air stream 208, clean air stream 210, contaminant stream 212, back pressure regulator valve 214, liquid sorbent circuit 216, filter 218, blower 220, filter 222, heat exchanger 224, pump 226, heater 228, liquid sorbent storage 230, pump 232, and cooler 234, respectively.

In some examples, a membrane dehumidifier may capture humidity from spent air for use as a sweep gas stream. FIG. 3A is a diagram illustrating an example contaminant removal system 300A for removing contaminants from spacesuit ventilation system 302 using a liquid sorbent with membrane scrubber-separator 304 and membrane stripper-separator 306 and removing humidity from spent air stream 308 using a membrane dehumidifier 348 for use as a sweep gas stream 352. Dehumidifier 348 is configured to remove humidity from spent air stream 308 for use as a sweep gas to stripper-separator 306. On one side, dehumidifier 348 is configured to receive spent air stream 308 as a feed gas stream and discharge spent air in a dried spent air stream 350 to scrubber-separator 304 having a lower humidity. On an opposite side, dehumidifier 348 is configured to discharge sweep gas stream 352 to stripper-separator 306 having a higher humidity, thus increasing the velocity of the gas on the gas phase side of stripper-separator 306. By capturing humidity from spent air prior to entry of spent air from spent air stream 308 into scrubber-separator 304, less water vapor may remain in the stream reaching the scrubber-separator. For example, removing water prior to going through scrubber-separator 304 may result in less excess water that is absorbed into the liquid sorbent. This water removal may allow for smaller sizing of scrubber-separator 304 and/or stripper-separator 306, and/or a smaller load on heater 328 and pumps 326 and 332. This water removal may also result in less water becoming absorbed into the liquid and, correspondingly, less water to be removed, such that cooling requirements of chiller 338 may be decreased, with a correspondingly decreased size and weight.

In some examples, a membrane dehumidifier may capture humidity from spent air to increase humidity of clean air. FIG. 3B is a diagram illustrating an example contaminant removal system 300B for removing contaminants from spacesuit ventilation system 302 using a liquid sorbent with membrane scrubber-separator 304 and membrane stripper-separator 306 and returning humidity from spent air stream 308 to clean air stream 310 using membrane dehumidifier 349. In the example of FIG. 3B, dehumidifier 349 is configured to return humidity from spent air stream 308 to clean air stream 310. On one side, dehumidifier 349 is configured to receive spent air stream 308 as a feed gas stream and discharge spent air in dried spent air stream 350 to scrubber-separator 304 having a lower humidity. On an opposite side, dehumidifier 349 is configured to receive a dry clean air stream 354 from scrubber-separator 304 and discharge clean air to clean air stream 310 having a higher humidity.

By capturing humidity from spent air prior to entry of spent air from spent air stream 308 into scrubber-separator 304, a greater amount of humidity may be preserved. Removing water from spent air stream 308 may improve comfort to the astronaut by maintaining the humidity of clean air stream 310 within a desired range. Removing water prior to going through scrubber-separator 304 may also reduce an amount of water that is absorbed into the liquid sorbent and, correspondingly, reduce an amount of water that may be removed by stripper-separator 306 through evaporative cooling. This water removal by dehumidifier 349 may permit smaller sizing of scrubber-separator 304 and/or stripper-separator 306, and/or a smaller load on pumps 326 and 332 due to reduced volume and/or may reduce an amount of power for heater 328 due to reduced evaporative cooling.

In some examples, two or more membrane dehumidifiers may capture humidity from spent air both for use as a sweep gas stream and to increase humidity of clean air. FIG. 3C is a diagram illustrating an example contaminant removal system 300C for removing contaminants from a spacesuit ventilation system 302 using a liquid sorbent with membrane scrubber-separator 304 and membrane stripper-separator 306 and removing humidity from spent air stream 308 using two parallel membrane dehumidifiers 348 and 349. Dehumidifier 348 is configured to remove humidity from spent air stream 308 for use as a sweep gas to stripper-separator 306. On one side, dehumidifier 348 is configured to receive spent air stream 308 as a feed gas stream and discharge spent air in a dried spent air stream 350 to scrubber-separator 304 having a lower humidity. Dehumidifier 349 is configured to return humidity from spent air stream 308 to clean air stream 310. On one side, dehumidifier 349 is configured to receive spent air stream 308 as a feed gas stream and discharge spent air in dried spent air stream 350 to scrubber-separator 304 having a lower humidity. On an opposite side, dehumidifier 349 is configured to receive a dry clean air stream 354 from scrubber-separator 304 and discharge clean air to clean air stream 310 having a higher humidity.

In some examples, a controller (not shown in FIGS. 3A-3C) may be configured to control a humidity within the environment of ventilation system 302. For example, the controller may be configured to control scrubbing and stripping operations to maintain a contaminant concentration below a threshold contaminant concentration, as explained with respect to controller 250 of FIG. 2. Further, the controller may be configured to recover water removed from spent air stream 308 and use the recovered water in one or more systems of systems 300A, 300B, or 300C. For example, to recover water from spent air stream 308, the controller may receive a humidity concentration of clean air stream 310 and, in response to determining that the water concentration is below a threshold, increase separation of water from spent air stream 308, such as by increasing a flow rate of the ventilation air circuit. As another example, to recover water from contaminant stream 312, the controller may receive a humidity concentration of clean air stream 310 and, in response to determining that the water concentration is below a threshold, increase condensation and/or separation of water from contaminant stream 312, such as by increasing a flow rate of cooling fluid to condenser 338 and/or increasing a speed of a mechanical separation device (centrifugal) of water separator 340.

In some examples, the controller may be configured to control sweep gas stream 352 of FIG. 3A or FIG. 3C by controlling membrane dehumidifier 348. For example, the controller may receive a humidity measurement of stripper-separator 306 and, in response to determining that the humidity measurement is outside a target humidity range, control an amount of water removed from spent air stream 308 to increase a flow rate and/or humidity of sweep gas stream 352.

Figure 4:
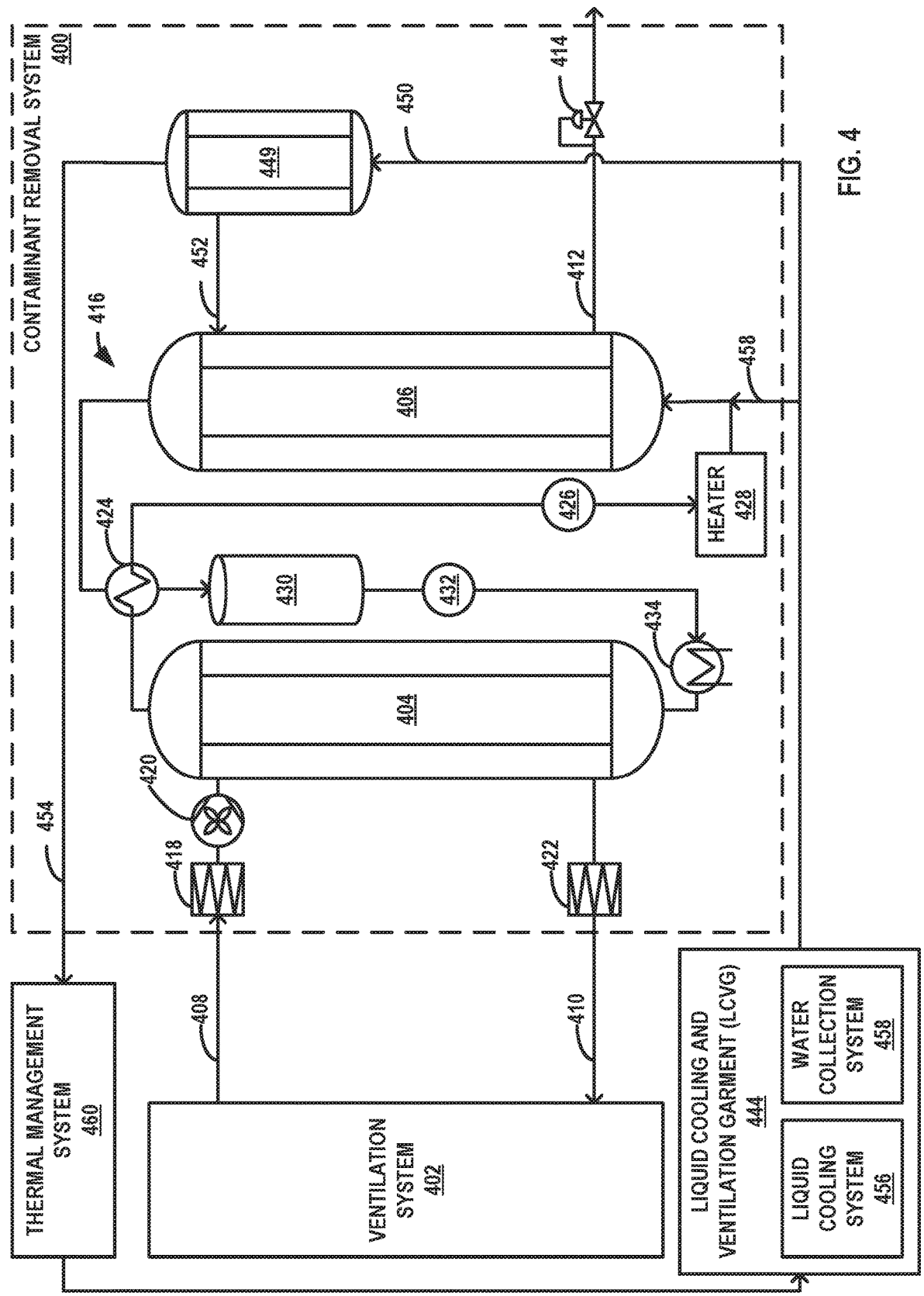
FIG. 4 is a diagram illustrating an example contaminant removal system for removing contaminants from a spacesuit ventilation system using a liquid sorbent with a membrane scrubber-separator and a membrane stripper-separator and removing humidity and heat from a liquid cooling and ventilation garment using a water vaporizer.

In some examples, contaminant removal systems discussed herein may be configured to assist in thermal management of a liquid cooling and ventilation garment using evaporation. For example, contaminant removal systems may be integrated into an open loop thermal control system, such that various contaminant removal processes and/or streams may be used to directly or indirectly remove heat from an astronaut. FIG. 4 is a diagram illustrating an example contaminant removal system 400 for removing contaminants from spacesuit ventilation system 402 using a liquid sorbent with membrane scrubber-separator 404 and membrane stripper-separator 406 and removing humidity from a liquid cooling and ventilation garment (LCVG) 444 using a water vaporizer 449. Unless otherwise indicated, components of contaminant removal system 400 may be operably similar to similarly named and/or numbered components of contaminant removal system 200 of FIG. 2. For example, a ventilation system 402, a scrubber-separator 404, a stripper-separator 406, a spent air stream 408, a clean air stream 410, a contaminant stream 412, a back pressure regulator valve 414, a liquid sorbent circuit 416, a filter 418, a blower 420, a filter 422, a heat exchanger 424, a pump 426, a heater 428, a liquid sorbent storage 430, a pump 432, and a cooler 434 may be functionally similar to ventilation system 202, scrubber-separator 204, stripper-separator 206, spent air stream 208, clean air stream 210, contaminant stream 212, back pressure regulator valve 214, liquid sorbent circuit 216, filter 218, blower 220, filter 222, heat exchanger 224, pump 226, heater 228, liquid sorbent storage 230, pump 232, and cooler 234, respectively.

LCVG 444 may be configured to remove heat and/or waste fluid from the astronaut. For example, LCVG 444 may include water collection system 458 configured to remove sweat from the astronaut and liquid cooling system 456 configured to remove heat from the astronaut using cooling water circulated and cooled by thermal management system 460, such as described with respect to water collection system 114, liquid cooling system 116, and thermal management system 112 of FIG. 1. LCVG 444 may include sealed tubes through which a cooling fluid, such as water, flows and removes heat from the astronaut. LCVG 444 may also include other fabrics or structures configured to remove sweat from the astronaut. Liquid cooling system 456 may pump the cooling water through the sealed tubes and cool the cooling water, such as through a heat exchanger and one or more coolant loops. Water collecting system 458 may collect the sweat and store the sweat or pump the sweat to another system. In some instances, liquid cooling system 456 and water collecting system 458 may be integrated, such that sweat may combine with the cooling water downstream of the astronaut. Thermal management system 460 may include one or more heat exchangers and/or pumps configured to remove heat from the cooling water, such as through a coolant circuit, and circulate the cooling water through LCVG 444.

In some examples, contaminant removal system 400 may be configured to assist in thermal management of LCVG 444. For example, contaminant removal system 400 may be integrated into thermal management system 460, such that contaminant removal system 400 may remove at least a portion of heat from LCVG 444. Water management system 458 may collect enough sweat and/or liquid sorbent circuit 416 may receive enough humidity through scrubber-separator 404 that a portion of the sweat and/or cooling water from LCVG 444 may be used as a sweep gas stream for stripper-separator 406. Contaminant removal system 400 may utilize the low pressure of the space vacuum environment to evaporate a portion of the cooling water and discharge a remainder of the cooling water back to LCVG 444. Evaporation of the portion of the cooling water may reduce a temperature of the remainder of the cooling water, thereby cooling the cooling water for recirculation to LCVG 444. In this way, contaminant removal system 400 may use a low pressure of the space vacuum environment to provide a sweep gas stream to the stripper-separator 406 and/or cool a cooling water stream for removing heat from the astronaut.

In the example of FIG. 4, water vaporizer 548 is configured to add water from LCVG 444 as a sweep gas stream 452 of stripper-separator 406. LCVG 444 may include a water collection system 458 and a liquid cooling system 456. In some examples, water vaporizer 449 is a membrane evaporator. For example, water vaporizer 548 may be configured to absorb water into a membrane and evaporate the water to the low pressure of the gas phase side of stripper-separator 406.

Water vaporizer 449 may be configured to receive a cooling water inlet stream 450 from LCVG 444. Water vaporizer 449 may be configured to vaporize and discharge at least a portion of the cooling water from cooling water inlet stream 450 to stripper-separator 406 as sweep gas stream 452, thereby removing heat from cooling water inlet stream 450. Water vaporizer 449 may be configured to discharge a remainder of cooling water from cooling water inlet stream 450 back to LCVG 444 as cooling water outlet stream 454 via thermal management system 460. As such, a temperature of cooling water in cooling water outlet stream 454 may be lower than a temperature of cooling water in cooling water inlet stream 450. By cooling the cooling water by evaporation using a space vacuum environment, contaminant removal system 400 may reduce a heat load on thermal management system 460. Additionally or alternatively, by providing a sweep gas stream 452 having a relatively high humidity, stripper-separator 406 may operate at a higher efficiency for desorbing contaminants.

In some examples, at least a portion of cooling water from LCVG 444 may be recycled to the liquid sorbent to maintain a water concentration of the liquid sorbent in liquid sorbent circuit 416. For example, scrubber-separator 404 and/or stripper-separator 406 may lose water over time. To restore a desired water concentration of the liquid sorbent, contaminant removal system 400 may add water to liquid sorbent circuit 416. For example, contaminant removal system 400 may include a water sorbent recycle stream 458 configured to discharge water from cooling water inlet stream 450 into liquid sorbent circuit 416. Water sorbent recycle stream 458 may include a pump and control valves to discharge the cooling water into liquid sorbent circuit 416. To recycle the recovered water from LCVG 444, the controller may receive a water concentration of liquid sorbent circuit 416 and, in response to the water concentration measuring below a threshold water concentration, control a flow control valve to discharge removed water from LCVG 444 through water sorbent recycle stream 458 into liquid sorbent circuit 416.

Figure 5:
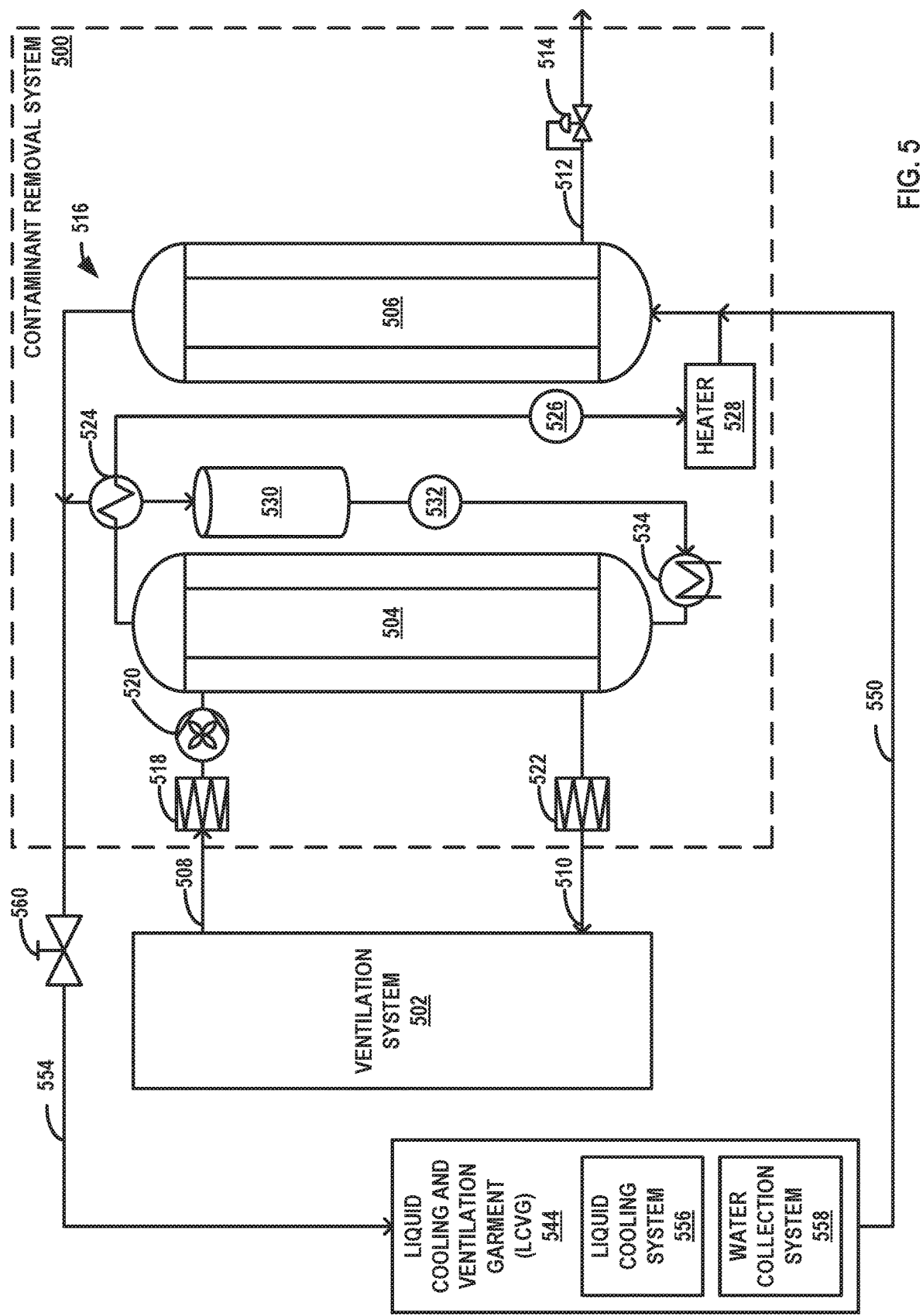
FIG. 5 is a diagram illustrating an example contaminant removal system for removing contaminants from a spacesuit ventilation system using a liquid sorbent with a membrane scrubber-separator and a membrane stripper-separator and removing heat from a liquid cooling and ventilation garment using liquid sorbent.

In some examples, contaminant removal systems discussed herein may be configured to assist in thermal management of a liquid cooling and ventilation garment using fluid heat exchange. For example, contaminant removal systems discussed herein may be configured to replace a cooling water circuit with a liquid sorbent circuit used for removing contaminants from a ventilation system, thereby eliminating another liquid system, cooling the astronaut, and/or recycling heat from the astronaut into the contaminant removal system. FIG. 5 is a diagram illustrating an example contaminant removal system 500 for removing contaminants from spacesuit ventilation system 502 using a liquid sorbent with membrane scrubber-separator 504 and membrane stripper-separator 506 and removing heat from cooling water from a liquid cooling and ventilation garment 544 using liquid sorbent. Unless otherwise indicated, components of contaminant removal system 500 may be operably similar to similarly named and/or numbered components of contaminant removal system 200 of FIG. 2. For example, a ventilation system 502, a scrubber-separator 504, a stripper-separator 506, a spent air stream 508, a clean air stream 510, a contaminant stream 512, a back pressure regulator valve 514, a liquid sorbent circuit 516, a filter 518, a blower 520, a filter 522, a heat exchanger 524, a pump 526, a heater 528, a liquid sorbent storage 530, a pump 532, and a cooler 534 may be functionally similar to ventilation system 202, scrubber-separator 204, stripper-separator 206, spent air stream 208, clean air stream 210, contaminant stream 212, back pressure regulator valve 214, liquid sorbent circuit 216, filter 218, blower 220, filter 222, heat exchanger 224, pump 226, heater 228, liquid sorbent storage 230, pump 232, and cooler 234, respectively.

LCVG 544 may be configured to remove heat and/or waste fluid from the astronaut. For example, LCVG 544 may include water collection system 558 configured to remove sweat from the astronaut and liquid cooling system 556 configured to remove heat from the astronaut using a cooling fluid, such as described with respect to water collection system 114 and liquid cooling system 116 of FIG. 1.

In some examples, contaminant removal system 500 may be configured to assist in thermal management of LCVG 544. For example, rather than integrate contaminant removal system 400 into a separate thermal management system 460, such as described in FIG. 4, contaminant removal system 500 may replace at least a portion of a thermal management system by supplying the liquid sorbent as the cooling fluid to LCVG 544. For example, LCVG 544 may be coupled in parallel to liquid sorbent circuit 516, such that liquid sorbent circuit 516 may remove heat from the astronaut.

In some examples, liquid sorbent circuit 516 is configured to circulate at least a portion of the liquid sorbent through a thermal management system 560 of the spacesuit and stripper-separator 506. Liquid sorbent circuit 516 may be configured to receive liquid sorbent from a liquid sorbent inlet stream 550 from LCVG 544. Liquid sorbent circuit 516 may be configured to cool the liquid sorbent, such as by using cooler 534, thereby removing heat from the liquid sorbent. Liquid sorbent circuit 516 may be configured to discharge the liquid sorbent from liquid sorbent inlet stream 550 back to LCVG 544 as liquid sorbent outlet stream 554. Stripper-separator 506 may thereby release water from water collection system 558 and heat from liquid cooling system 556 to the space vacuum environment. By cooling the astronaut using liquid sorbent circuit 516, contaminant removal system 500 may reduce a power consumption, size, and/or weight of a life support system of the spacesuit, such as by supplementing or replacing a thermal management system for cooling LCVG 544. For example, by using human heat as the heater ahead of stripper-separator 506, an amount of thermal energy to be supplied to the ionic liquid ahead of stripper-separator 506 may be reduced. Additionally or alternatively, by supplying additional water to liquid sorbent circuit 516, such as from water collection system 558, contaminant removal system 500 may maintain a water content of the liquid sorbent and/or make up for any fluid losses from liquid sorbent circuit 516.

Figure 6:
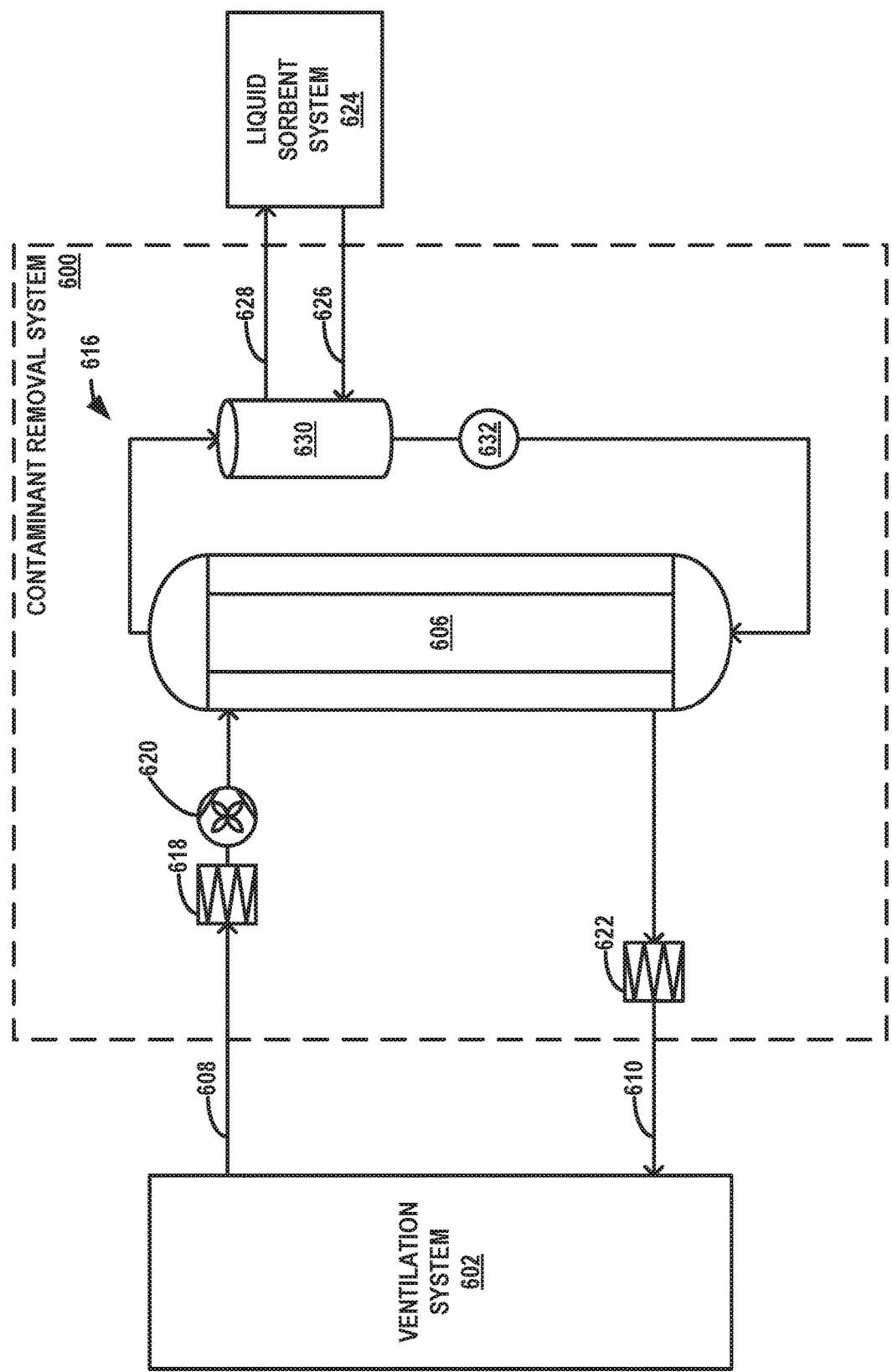
FIG. 6 is a diagram illustrating an example contaminant removal system for removing contaminants from a ventilation system using a single membrane separator using a liquid sorbent and exchanging the liquid sorbent with a liquid sorbent system off the spacesuit.

In some embodiments of contaminant removal systems discussed herein, contaminants may be removed from spacesuit using a single membrane separator. For example, a single membrane separator may be used for continuous scrubbing of contaminants from an air stream and subsequent storage of contaminants in a liquid sorbent circuit for removal and replacement. FIG. 6 is a diagram illustrating an example contaminant removal system 600 for removing contaminants from a ventilation system 602 using a single membrane separator 604 using a liquid sorbent and exchanging the liquid sorbent with a liquid sorbent system 624 off the spacesuit. Unless otherwise indicated, components of contaminant removal system 600 may be operably similar to similarly named and/or numbered components of contaminant removal system 200 of FIG. 2. For example, a ventilation system 602, a spent air stream 608, a clean air stream 610, a contaminant stream 612, a filter 618, a blower 620, a filter 622, a liquid sorbent storage 630, a pump 632, and a heat exchanger 634 may be functionally similar to ventilation system 202, spent air stream 208, clean air stream 210, contaminant stream 212, filter 218, blower 220, filter 222, liquid sorbent storage 230, pump 232, and cooler 234, respectively.

Spacesuit contaminant removal system 600 may include an inlet configured to receive spent air stream 608 from ventilation system 602 and an outlet configured to discharge clean air stream 610 to ventilation system 602. In some examples, contaminant removal system 600 includes an overboard inlet stream 626 configured to receive fresh liquid sorbent into the spacesuit and an overboard outlet stream 628 configured to discharge used liquid sorbent from the spacesuit.

Contaminant removal system 600 includes separator 604 configured to absorb contaminants from spent air to produce clean air and discharge spent liquid sorbent for removal and replacement from the spacesuit. Separator 604 may form a liquid sorbent circuit 616 that is capable of continuous scrubbing of contaminants from the spent air in separator 604 to produce clean air and store used liquid sorbent on-board until the liquid sorbent may be discharged from the spacesuit for subsequent stripping overboard. On a gas phase side, separator 604 is configured to receive a spent air stream 608 from ventilation system. Separator 604 may absorb a contaminant from spent air stream 308 into a liquid sorbent. Separator 604 is configured to discharge clean air to a clean air stream 610 for return to ventilation system 602. On a liquid phase side, separator 604 is configured to receive clean liquid sorbent and discharge used liquid sorbent having a higher concentration of contaminants. Once discharged, the liquid sorbent may either be stored and replaced with clean liquid sorbent or scrubbed and returned to the spacesuit as recharged liquid sorbent, such as from liquid sorbent system 624.

Various examples have been described. These and other examples are within the scope of the following claims.

What is claimed is:

1. A spacesuit contaminant removal system comprising:
   at least one membrane separator configured to:
   receive a spent air stream from a ventilation system of a spacesuit,
   absorb a contaminant from the spent air stream into a liquid sorbent,
   discharge a clean air stream to the ventilation system, and
   discharge the contaminant in a contaminant stream;
   a liquid sorbent circuit configured to circulate the liquid sorbent through the at least one membrane separator, wherein the at least one membrane separator comprises:
   a scrubber-separator configured to absorb the contaminant from the spent air stream into the liquid sorbent, and discharge the clean air stream to the ventilation system; and
   a stripper-separator downstream of the scrubber-separator and configured to desorb the contaminant from the liquid sorbent using a vacuum of a space environment, and discharge the contaminant stream to the space environment; and
   a water vaporizer configured to:
   receive a cooling water stream from a liquid cooling and ventilation garment of the spacesuit,
   discharge at least a portion of the water stream to the stripper-separator as a sweep gas stream using the vacuum of the space environment, and
   discharge a remainder of the water stream to the liquid cooling and ventilation garment of the spacesuit.

2. The spacesuit contaminant removal system of claim 1, further comprising a membrane dehumidifier configured to:
   remove humidity from the spent air stream; and
   discharge the humidity to the stripper-separator as another sweep gas stream.

3. The spacesuit contaminant removal system of claim 1, further comprising
   a water separator configured to remove water from the contaminant stream wherein the water vaporizer is configured to discharge the sweep gas stream containing the removed water to the stripper-separator.

4. The spacesuit contaminant removal system of claim 1, wherein the liquid sorbent circuit is further configured to circulate at least a portion of the liquid sorbent through a thermal management system of the spacesuit and the stripper-separator.

5. The spacesuit contaminant removal system of claim 4, wherein the thermal management system is configured to receive a cooling water stream from a water collection system of the liquid cooling.

6. The spacesuit contaminant removal system of claim 4, wherein the thermal management system is configured to receive a cooling water stream from a liquid cooling system of the liquid cooling and ventilation garment.

7. The spacesuit contaminant removal system of claim 1, wherein the liquid sorbent circuit is configured to:
   receive clean liquid sorbent from a liquid sorbent system external to the spacesuit, and
   discharge used liquid sorbent to the liquid sorbent system.

8. The spacesuit contaminant removal system of claim 1, wherein the contaminant is carbon dioxide.

9. A spacesuit contaminant removal system comprising:
   at least one membrane separator configured to:
   receive a spent air stream from a ventilation system of a spacesuit,
   absorb a contaminant from the spent air stream into a liquid sorbent,
   discharge a clean air stream to the ventilation system, and
   discharge the contaminant in a contaminant stream;
   a liquid sorbent circuit configured to circulate the liquid sorbent through the at least one membrane separator, wherein the at least one membrane separator comprises:
   a scrubber-separator configured to absorb the contaminant from the spent air stream into the liquid sorbent, and discharge the clean air stream to the ventilation system; and
   a stripper-separator downstream of the scrubber-separator and configured to desorb the contaminant from the liquid sorbent using a vacuum of a space environment, and discharge the contaminant stream to the space environment, and
   wherein the liquid sorbent circuit is further configured to receive water from a cooling water stream of a liquid cooling and ventilation garment of the spacesuit into the liquid sorbent.

10. The spacesuit contaminant removal system of claim 9, further comprising a membrane dehumidifier configured to:
    remove humidity from the spent air stream; and
    discharge the humidity to the stripper-separator as a sweep gas stream.

11. The spacesuit contaminant removal system of claim 9, further comprising:
    a water separator configured to remove water from the contaminant stream; and
    a water vaporizer is configured to discharge a sweep gas stream containing the removed water to the stripper-separator.

12. The spacesuit contaminant removal system of claim 9, wherein the liquid sorbent circuit is further configured to circulate at least a portion of the liquid sorbent through a thermal management system of the spacesuit and the stripper-separator.

13. The spacesuit contaminant removal system of claim 12, wherein the thermal management system is configured to receive a cooling water stream from at least one of a water collection system the liquid cooling and ventilation garment or a liquid cooling system of the liquid cooling and ventilation garment.

14. The spacesuit contaminant removal system of claim 9, wherein the liquid sorbent circuit is configured to:
    receive clean liquid sorbent from a liquid sorbent system external to the spacesuit, and
    discharge used liquid sorbent to the liquid sorbent system.

15. The spacesuit contaminant removal system of claim 9, wherein the contaminant is carbon dioxide.

16. The spacesuit contaminant removal system of claim 9, further comprising the spacesuit.

* * * * *